United States Patent [19]

Wyller

[11] 4,239,376
[45] Dec. 16, 1980

[54] PRINT MAKER

[76] Inventor: Arne A. Wyller, Vinterbrinksvägen 51, S-13300 Saltsjöbaden, Sweden

[21] Appl. No.: 4,437

[22] Filed: Jan. 18, 1979

[51] Int. Cl.³ .................. G03B 27/32; G03B 27/52
[52] U.S. Cl. ............................. 355/27; 355/39; 355/43; 355/65
[58] Field of Search .............. 355/18, 21, 27, 39, 355/43, 45, 65, 66, 75, 133, 28, 113, 44

[56] References Cited

U.S. PATENT DOCUMENTS

| | | | |
|---|---|---|---|
| 891,347 | 6/1908 | Kroedel | 355/21 |
| 1,925,902 | 9/1933 | Lindemann | 355/133 |
| 2,751,814 | 6/1956 | Limberger | 355/28 |
| 3,065,667 | 11/1962 | Edgerton | 355/27 |
| 3,067,666 | 12/1962 | Coffman | 355/113 |
| 3,366,003 | 1/1968 | Williamson | 355/66 X |
| 3,677,636 | 7/1972 | Stein | 355/18 |
| 3,689,148 | 9/1972 | Black | 355/18 |
| 3,890,045 | 6/1975 | Bernstein et al. | 355/45 X |
| 4,026,651 | 5/1977 | Vitou | 355/44 |
| 4,082,446 | 4/1978 | Driscoll et al. | 355/27 |

*Primary Examiner*—Richard A. Wintercorn
*Attorney, Agent, or Firm*—Steele, Gould & Fried

[57] ABSTRACT

A compact and transportable apparatus for making instant prints from slides or transparencies, without the need for darkroom facilities, comprising: a housing, having a lens-shutter assembly and means for attaching a film pack in operable relation to the lens-shutter assembly; a slide station, having means for holding a slide or transparency to be copied; and, a light diffuser assembly, for evenly illuminating the slide during copying, whereby an optical path is formed in said diffuser assembly, passing through the slide or transparency, the lens-shutter assembly, and onto said film pack. The overall size of the apparatus may be reduced by interposing at least one mirror in the optical path.

8 Claims, 6 Drawing Figures

PRINT MAKER

BACKGROUND OF THE INVENTION

1. Field of the Invention

The invention relates to photographic printmakers, and in particular, to a novel apparatus for making prints from transparencies, commonly referred to as slides, by the use of self-developing films.

2. Description of Prior Art

Today, with the expanding use of 35-mm cameras, reaching a mass-audience not familiar with or willing to be familiar with old-fashioned darkroom techniques, there is an evergorwing need for extremely simple to operate devices for making prints in standard enlarged formats from slides. Often during a slideshow (private or public), someone in the audience (family, friends or general public) would like a print of a particular slide shown, or the amateur-photographer himself would like some simple prints of his own slides to put into his print-book and would like these prints instantly and simply produced without fuss and without the need for taking the slides to be processed by ordinary professional or commercial firms.

There are known in the prior art a number of photographic printing devices, but none totally fulfills the requirements of utmost simplicity of operation in the conversion of slides or transparencies to prints in standard sizes. Among the more recent patents is U.S. Pat. No. 4,026,651, which incorporates the simplifying element of self-developing film but applies it to providing a print from another photographic print, i.e. a print to print conversion. Also known is the transparency copying attachment of U.S. Pat. No. 3,689,148, which attaches to an already existing camera and basically converts one transparency to another transparency, i.e. a slide to slide conversion. Finally, there is the transportable photographic enlarger of U.S. Pat. No. 3,677,636, but as the name implies, the device uses conventional techniques such as lightbulbs and photographic paper, and ultimately requires access to conventional darkroom facilities.

There is therefore a great need in the photographic art for a slide printmaker, which is compact, operable independent of darkroom equipment, easy to operate by a person of minimum skill or training, and which delivers the print instantly.

SUMMARY OF THE INVENTION

It is an object of this invention to provide an improved slide print maker of simple and compact construction.

It is a further object of this invention to provide an improved slide print maker which is operable independently of darkroom equipment and facilities.

It is another object of this invention to provide an improved slide print maker which may be operated by a person of minimum skill or training.

It is yet another object of this invention to provide an improved slide print maker which delivers the print instantly.

It is yet another object of this invention to provide an improved slide print maker of simple and compact construction, which is operable independently of darkroom equipment or facilities, and which may therefore be operated by a person with minimum skill or training, and which yields prints instantly.

These and other objects are accomplished by providing an apparatus comprising a housing, having a lens-shutter assembly and means for attaching a film pack in operable relation to the lens-shutter assembly, a slide station, having means for holding a slide or transparency to be copied, and a light diffuser assembly, for evenly illuminating the slide during copying. The lens-shutter assembly, preferably including an enlarging lens with an electronic exposure meter-shutter assembly, projects an enlarged image of the slide onto the emulsion of the film pack, which is self-developing. The source of illumination for the light diffuser assembly may be natural sunlight, an electronic flash, a flash bulb, a quartz-halogen lamp or other suitable high temperature light source. The optical path is formed from the illumination source, through the diffuser assembly, through the slide and lens-shutter assembly and onto the film pack. The apparatus may be made further compact by use of at least one mirror to fold the optical path. In order for one to use the apparatus, one need only insert a slide into the slide-holding means, press the shutter release button, and pull out the tab of the self-developing film, following established procedure for the use of self-developing film. If the film pack is motorized, the exposed film is extracted by pushing a second button.

Further objects and features of the invention will be understood more readily upon reading the following descriptions, together with the drawings.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

An apparatus for making prints from slides or transparencies according to the subject invention generally comprises three principal components. The first component is a housing, having a lens-shutter assembly and means for attaching a film pack in operable relation to the lens-shutter assembly. The second component is a slide station, having means for holding a slide or transparency to be copied. The third component is a light diffuser assembly, for evenly and uniformly illuminating the slide or transparency during copying. The components are disposed with respect to one another such that an optical path is formed in the light diffuser assembly, passing through the slide or transparency, through the lens-shutter assembly and onto the exposed emulsion of the film pack. The optical path may also be thought of as originating with a source of illumination. Where such illumination is natural light or photo flood lamps or the like, the source of illumination does not form an integral part of the apparatus. Where the apparatus utilizes a photoflash assembly, the optical path may be thought of as originating with the flash assembly.

Figure 1:
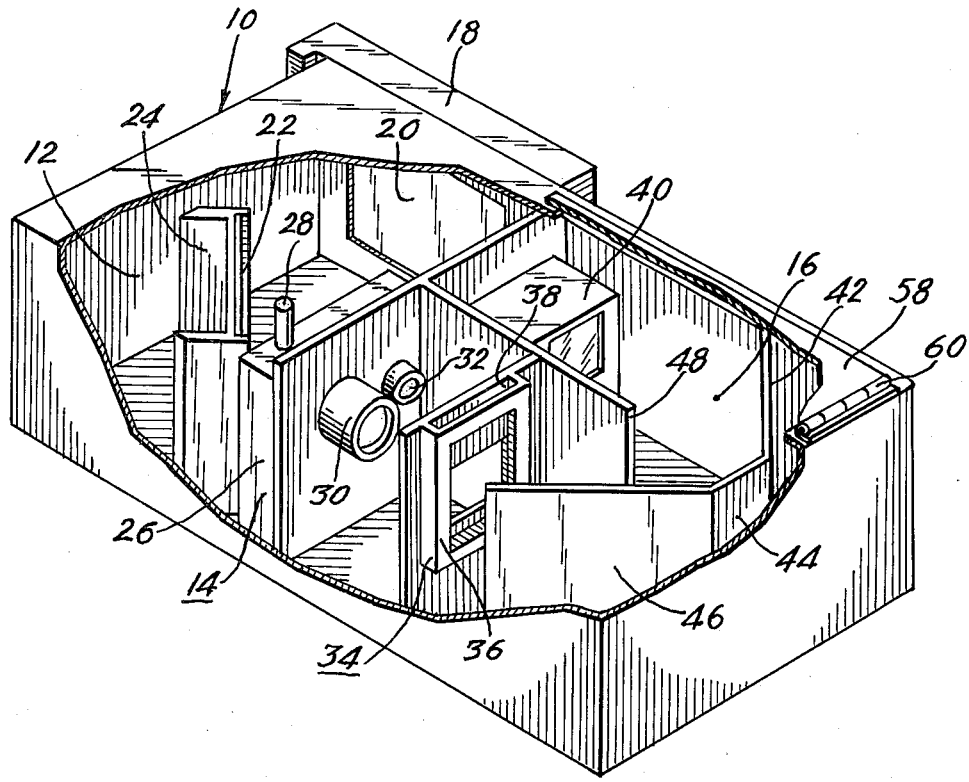
FIG. 1 is a perspective view of one embodiment of the subject invention, with portions of the walls cut away.
Figure 2:
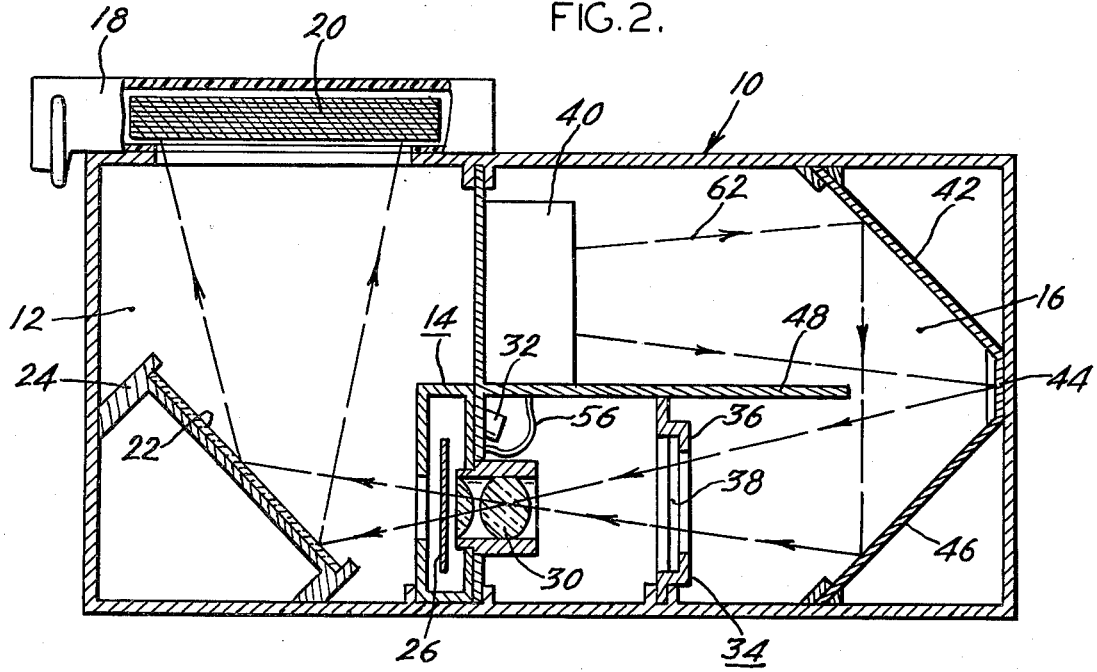
FIG. 2 is a top view of FIG. 1, with the top entirely cut away.
Figure 3:
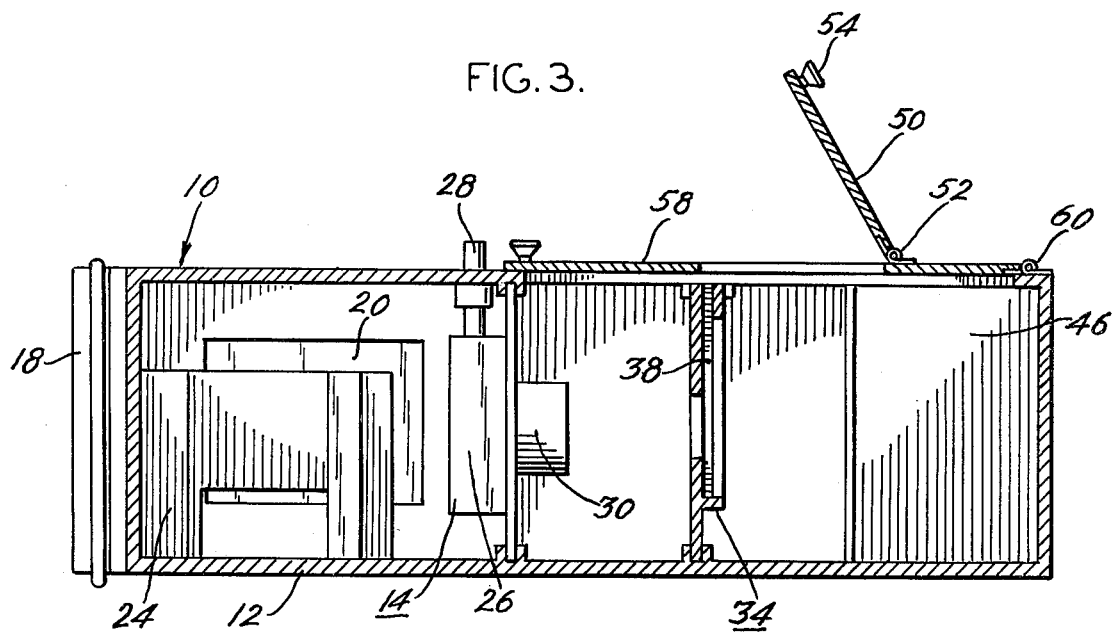
FIG. 3 is a side view of FIG. 2, with the side wall entirely cut away.

Two preferred embodiments of the subject invention are illustrated in the drawings. Each of these embodiments comprises the three principal components noted above, but differ in other respects as will be described in detail herein. The embodiment shown in FIGS. 1-3 is a particularly compact arrangement, which further utilizes a mirror interposed in the optical path, in order to fold or bend the optical path. It has also been found that a baffle is necessary in the light diffuser assembly in this embodiment. This embodiment is one which incorporates photoflash means, and accordingly, is completely self-contained. The embodiment illustrated in FIGS. 4-6 does not utilize a mirror to bend or fold the optical path, and accordingly, does not need a baffle in the light diffuser assembly. This embodiment is particularly useful for utilizing natural light or external photolamp illumination means, because the light diffuser assembly is not closed, as in the embodiment shown in FIGS. 1-3. Each of these embodiments is most advantageous for different conditions of lighting. The two presently preferred embodiments will now be described in detail.

With reference to FIG. 1, the print maker 10 comprises a housing 12, having a lens-shutter assembly 14 and a film pack 18, having self-developing film 20, disposed in operable relation to the lens-shutter assembly. The lens-shutter assembly 14 comprises shutter 26, shutter release button 28, lens 30 and neutral density filter 32.

The print maker further comprises a slide station 34, having means for holding slides or transparencies to be copied, and a light diffuser assembly 16. The slide station 34 has members 36 which assist in keeping slide or transparency flat during copying. The slide or transparency may be inserted into slide station 34 through slot 38.

The light diffuser assembly 16 comprises light diffuser panels 42, 44 and 46, as well as baffle means 48 and photoflash unit 40, which may be an electronic flash unit.

The optical path of the print maker 10 is shown in FIG. 2, by rays 62. The positioning of a mirror 22, mounted on mirror mounting bracket 24, illustrates the manner in which the optical path is bent or folded between the lens-shutter assembly 14 and the film pack 18. FIG. 2 also illustrates the manner in which the optical path is bent or folded in the light diffuser assembly 16 by the baffle means 48 and the light diffuser panels 42, 44 and 46. As indicated, in this embodiment, the optical path may be thought of as originating with photoflash unit 40.

The bottom, top and side walls of the print maker 10 may be formed from sheet metal or plastic, as may the internal rib structure which is shown supporting the lens-shutter assembly, the slide station, the photoflash unit and the other components of the print maker. In order for the apparatus to function properly, the housing 12, which holds the lens-shutter assembly, the mirror and the film pack, must be light tight. Accordingly, the film pack 18 must be detachably mounted to the wall of the housing in a light tight fashion as is known in the art. The light diffuser assembly 16 and the area between the slide station 34 and the lens-shutter assembly 14 need not be absolutely light tight, but should be reasonably light tight. Access to the slide station 34 may be provided by door 50, which as shown in FIG. 3, is mounted by a hinge-spring assembly 52 and has a handle or knob 54. In order to provide access to the flash unit as well, most or all of the top wall covering the light diffuser assembly 16 and the area between slide station 34 and the lens-shutter assembly 14 may itself be covered by a large door 58, a portion of which is shown in FIG. 1, the door being secured by a hinge-spring assembly 60. Where such a large door is utilized, the smaller door 50 may be mounted to the larger door 58.

In order to further enhance the quality and efficiency of the print maker, all of the internal walls of the print maker are of a flat black color or finish, including both sides of baffle means 48. It is only the inwardly facing surfaces of light diffuser panels 42, 44 and 46 which are a flat white color.

The lens-shutter assembly may be chosen from a number of suitable lens-shutter combinations known in the art. The function of the lens-shutter assembly is to project a well-focused image of the slide or transparency on to the emulsion of the self-developing film. The lens of the lens-shutter assembly may be chosen so that the image of the slide fills the entire image recording area of the film. The shutter 26 of the lens-shutter assembly may be of the focal plane or leaf-type, also well known those skilled in the art. Means for activating the shutter are incorporated in the mechanism activated by the shutter release buttom 28, which also synchronizes illumination of the photoflash means 40. This is provided by wire means 56, shown in FIG. 2. The aperture, or F-stop, of the lens-shutter assembly, can be regulated as necessary to provide the correct exposure. The lens-shutter assembly may also incorporate a neutral density filter which also assists in regulating exposure. It may also be desirable to provide the lens-shutter assembly with an exposure meter, but for purposes of simplification, this is not illustrated in the drawings. In the presently preferred embodiment, the lens-shutter assembly 14 is an electronic lens-shutter assembly, as is known in the art. Self-developing film 20 for the film pack 18 is currently manufactured by the Polaroid or Kodak corporations, and is sold under their respective trademarks. Such self-developing film as that sold by Polaroid normally contains a tab for drawing the film out of the pack after exposure. In other versions, the film pack is motorized, and the film is extracted by pushing a button.

It is contemplated that the lens-shutter assembly and the photoflash unit would be preset or adjusted to provide a properly exposed print from a properly exposed slide or transparency. Means would then be available, either by adjusting the F-stop, the shutter speed or the neutral density filter, to allow for copying slides which are over or under exposed. The operational sequence is therefore extremely simple. The operator lifts door 50 and inserts a slide or transparency through slot 38 in slide station 34. The operator then releases door 50, which closes by a combination of gravitational attraction and the hinge-spring assembly, and presses shutter release button 28. The operator then need only extract the exposed film 20 from film pack 18 to develop in the normal fashion. This involves only waiting the prescribed amount of time in the non-motorized version, before peeling off the cover of the film, or in the motorized version, of merely waiting for the film to be expelled and waiting for the picture to develop. The apparatus is safe, fast, and virtually foolproof. If for some reason the slide or transparency is not properly exposed, then adjustments may be made in order to produce a properly exposed print. In some instances, therefore, the copied prints may be of even better quality than the slide or transparency from which it was made.

Figure 4:
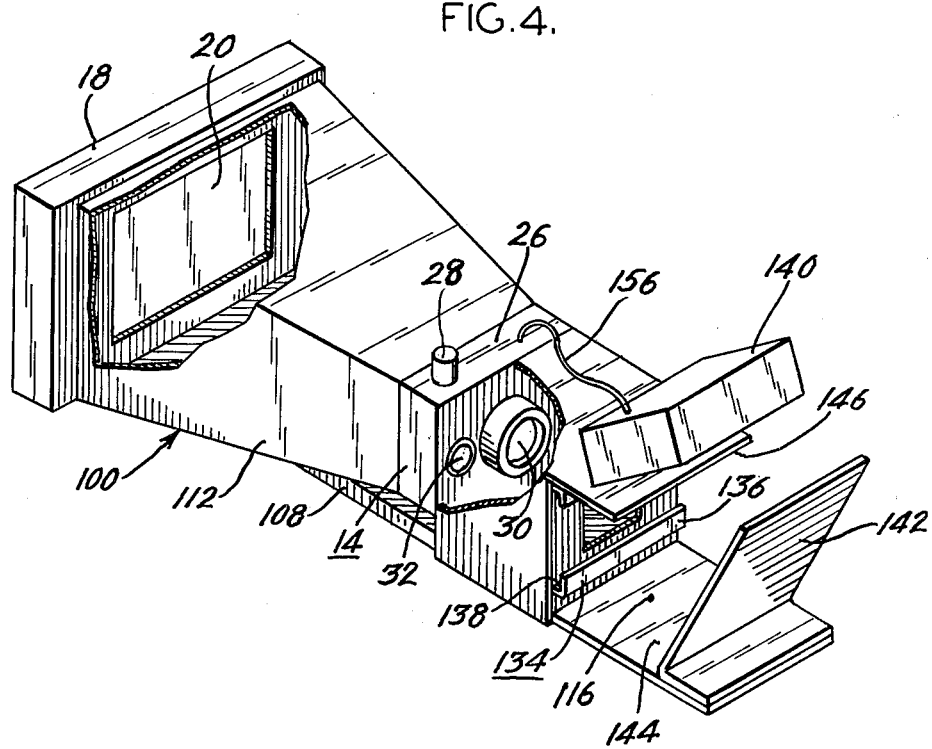
FIG. 4 is a perspective view of another embodiment of the subject invention, with portions of walls cut away.
Figure 5:
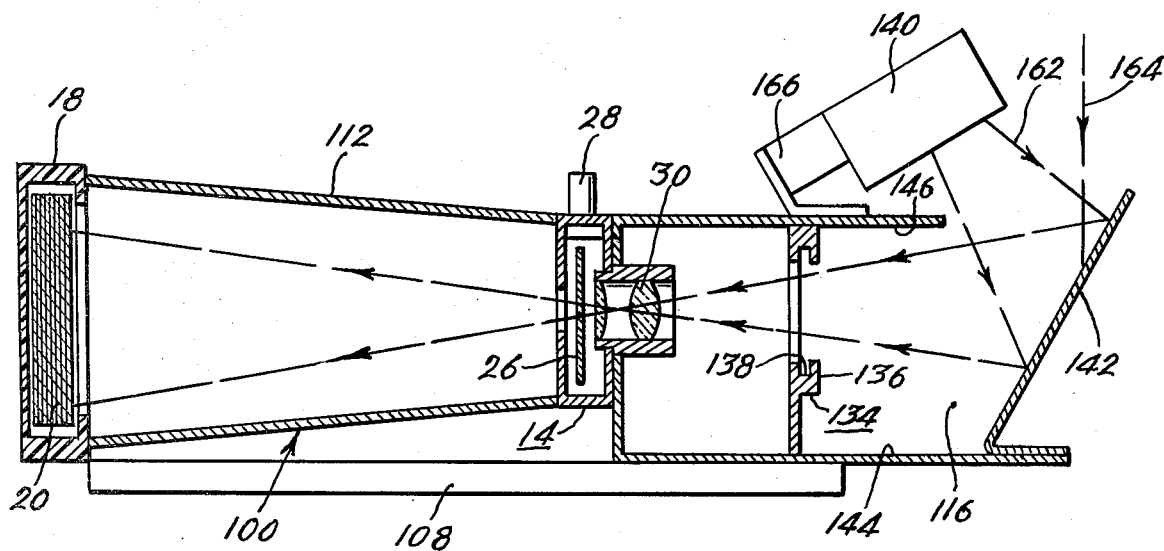
FIG. 5 is a side view of FIG. 4, with all side walls entirely cut away.
Figure 6:
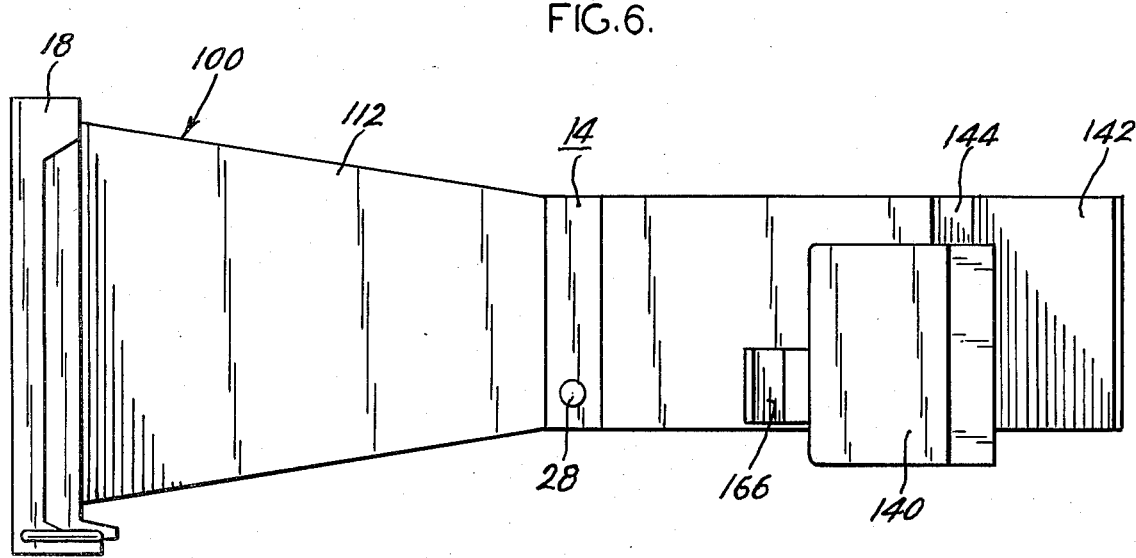
FIG. 6 is a top view of FIG. 5.

The embodiment shown in FIGS. 4-6 has a simpler geometry with respect to the optical path, and is therefore a less compact configuration than that shown in FIGS. 1-3. However, the embodiment shown in FIGS. 4-6 is particularly adapted for use with natural or external photoillumination means. With reference to FIG. 4, the print maker 100 comprises a housing 112, having a lens-shutter assembly 14 at one end and a film pack 18, containing self-developing film 20, at the opposite end. The housing 112 as well as the other components of the print maker 100 are mounted on structural support member 108. The print maker 100 further comprises a slide station 134 and a light diffuser assembly 116. The slide station 134 has slide or transparency supporting means 136, with access through side openings 138. The light diffuser assembly 116 is provided with light diffusing panels 142, 144 and 146, but need not be provided with side walls. Accordingly, although this embodiment may be provided with a photoflash unit 140, mounted on bracket 166, it may also be used with natural light or with an external photoflood lamp source, such as a quartz halogen lamp. The lens-shutter assembly may be identical to that described with respect to the embodiment shown in FIGS. 1-3, and is provided with a shutter 26, shutter release button 28, lens 30 and neutral density filter 32.

The optical path is illustrated in FIG. 5, by rays designated 162 leaving flash unit 140. The Figure also illustrates, by means of ray 164, that natural light or an external illumination means may be utilized.

As with the embodiment shown in FIGS. 1-3, the various walls, tops and bottoms of this apparatus may be sheet metal or molded plastic, preferably the latter.

The operation of this latter embodiment is similar to the first described embodiment. The slide or transparency to be copied is placed in slide station 134. Photoillumination means is provided by orienting the apparatus to "catch" natural or photoflood light in the light diffuser assembly or by attaching a photoflash means. The shutter release is then depressed, and the film is developed, i.e., removed from the film pack, in the normal fashion.

The present invention may be embodied in other specific forms without departing from the spirit or essential attributes thereof, and accordingly, reference should be made to the appended claims rather than to the foregoing specification as indicating the scope of the invention.

I claim:

1. An apparatus for making prints from slides or transparencies, comprising:
    a housing having first, second and third compartments, each of said compartments being adjacent the other, and at least the first compartment being light tight;
    a lens-shutter assembly disposed between the first and second compartments, defining an inner wall;
    a slide station, having means for holding a slide or transparency to be copied, disposed between the second and third compartments, defining another inner wall;
    the first compartment having means for attaching a film pack to an outer wall, in operable relation to the lens-shutter assembly, said compartment being light tight when said film pack is attached, and further having at least one mirror optically interposed between the lens-shutter assembly and the film pack;
    the third compartment having first and second portions partially separated by a baffle wall and optically connected by light reflecting and diffusing panels, and having means for removeably mounting an artificial light source at the end of the compartment optically opposite from the slide station, whereby an optical path may be established, originating in the third compartment, at the defined opposite end, being reflected by the light diffusing panels through the slide station, passing through the lens-shutter assembly and being reflected by the at least one mirror onto the film pack.

2. The apparatus of claim 1, further comprising an artificial source of illumination in the third compartment.

3. The apparatus of claim 1, wherein said film pack comprises self-developing film.

4. The apparatus of claim 3, wherein said film pack is motorized.

5. The apparatus of claim 1, wherein the lens-shutter assembly includes means for synchronizing the artificial source of illumination.

6. The apparatus of claim 1, wherein said slide station further comprises means for keeping the slide or transparency flat during copying.

7. The apparatus of claim 1, wherein said lens-shutter assembly further comprises means for automatically controlling exposure of said film.

8. The apparatus of claim 1, wherein the film pack, the lens-shutter assembly and the slide station are disposed in a spatial relationship which provides enlarged prints of said slide or transparency.

* * * * *